June 5, 1956 H. A. TRAUB 2,749,193
BACK UP WASHER
Filed April 24, 1952
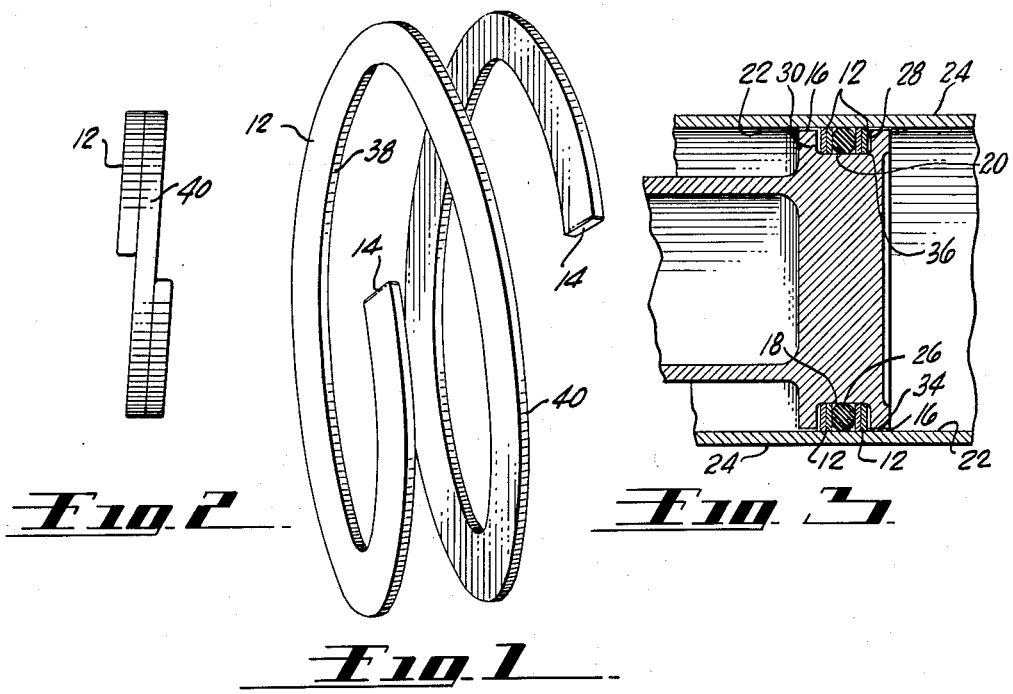
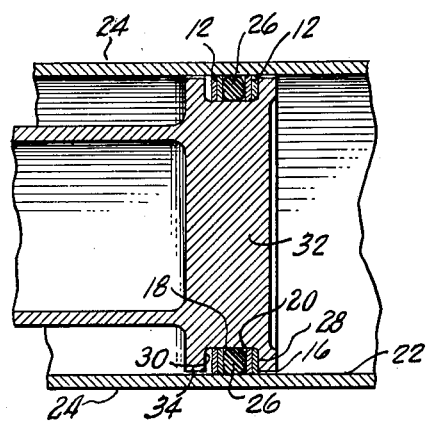
INVENTOR.
HENRY A. TRAUB
BY
-ATTORNEY-

United States Patent Office 2,749,193
Patented June 5, 1956

2,749,193

BACK UP WASHER

Henry A. Traub, Santa Monica, Calif., assignor to Douglas Aircraft Company, Inc., Santa Monica, Calif.

Application April 24, 1952, Serial No. 284,010

6 Claims. (Cl. 309—23)

This invention relates to sealing or packing arrangements and more particularly to the use of a helical back up washer in conjunction with standard type sealing or packing rings in order to greatly increase the efficiency and longevity of the sealing arrangement.

Various expedients have been proposed for preventing the leakage of fluid between the concentric mating surfaces of two members, such as a shaft and its bearing support, which extend one within the other. The standard arrangement involves the use of an elastically deformable, pressurally extrudable packing or O ring which is mounted in an annular groove formed in one of the mating members. Quite commonly, this packing ring is reinforced or backed up by the use of such means as split ring or chevron type back up washers. The intended purpose of such washers has primarily been to prevent pressural extrusion of the softer packing ring into the space between the two mating members.

In the past it has been found that such washers, when made of metal, are likely to defeat their purpose by chewing or otherwise damaging the sealing ring. This is a common fault where a split metal ring is used to back up the sealing ring. Moreover the metal types of back up washers generally are poor from the standpoint of keeping friction to a minimum. Other common back up washers are made of leather, pressed fiber or like materials. These generally are not likely to severely damage the packing ring, but the life of such washers is generally short. This is particularly true where such back up washers are used in hydraulic systems and the particular hydraulic fluid contains various chemical components.

The present invention, resulting from extensive development and testing, represents a completely satisfactory solution to many of the problems and weaknesses inherent in presently known types of back up washers. This result is achieved by the use of a plastic polymer having high surface lubricity which is machined or otherwise formed into a helical configuration comprising more than one coil. Damage to the adjacent packing ring is avoided since no split is present to chew at the ring as the washer "works" or expands and contracts under pressure. The plastic is flexible yet hard and has a low coefficient of friction on itself and most other surfaces, which aids greatly in keeping friction to a minimum.

Further advantages lie in the fact that the spiral or helical configuration permits the washer to alter its diameter as it is worked under pressure even though no "split" is present. The low coefficient of friction of the washer material, which acts as a solid lubricant, permits each coil of the helix to slide on the surface of the adjacent coil, throughout a wide range of temperature and pressure conditions. The lack of the split present in other washers also decreases fluid leakage.

Figure 1 is a perspective view depicting the back up washer in an axially flexed position for purposes of clarity;

Figure 2 is a side elevational view of the washer illustrating it in its normal unflexed condition;

Figure 3 is a side elevational view in section of a piston and cylinder combination showing two washers installed adjacent a packing ring mounted in an annular groove formed in the surface of a shaft or other concentric mating member; and Figure 4 is a side elevational view in section illustrating the installation of Figure 3 after fluid pressure has been applied to the left end of the installation.

Referring now to Figures 1 and 2 it will be seen that the back up washer of the present invention consists of a polytetrafluoroethylene plastic spiral or helix 12 which may be made of any readily formable or machinable plastic or elastomeric material in a condition normally considered as hard for such materials. Teflon has been found to be especially suitable and in particular a polymer of tetrafluoroethylene known in the trade at the electrical grade of Teflon in hard condition is preferred.

It has been found that the best functioning configuration is one in which the number of coils in the helix is greater than one and one-half. It is to be understood that a "coil" is considered to be one complete 360 degree loop in the helix. The particular washer shown in Figure 1 has slightly less than two continuous coils. This has been found to be the most efficient arrangement where the washer is used, as shown in Figures 3 and 4, in conjunction with a standard type O ring.

The ends 14 of the plastic helix 12 should be blunt or square cut. The cross section of the coils of the helix, as shown for instance in Figure 3, should be rectangular for maximum sealing in most installations. The width of the rectangle is preferably less than one half of the length of the rectangle, although other proportions may be used. Likewise the novel features of the washer are not departed from should the particular washer deviate from the rectangular cross sectional shape. However, the rectangular shape gives surface to surface contact with the base or bottom wall 18 of the annular groove 20 and with the mating surface 22 of the opposed concentric member or bearing 24. Moreover, it additionally provides maximum surface to surface support to the adjacent coil or coils.

The typical installation, shown in Figure 3, illustrates the use of two washers 12 mounted axially adjacent the packing ring 26, the latter customarily being formed of elastically deformable, pressurally extrudable materials such as rubber. The ring is customarily mounted in an annular groove 20 having bottom wall 18 and side walls 28 and 30 and being formed, in this case, in the inner of two members 24 and 32 which have concentric mating surfaces 22 and 34. Obviously, where the nature of the particular installation calls for it the washer and sealing ring may be mounted in an annular groove formed in the outer mating member as will be apparent to those skilled in the art.

As shown in Figure 4, when fluid pressure is applied to the left side of the sealing arrangement, the sealing ring and washers will be forced to the right side of the groove. In so doing, at least one of the coils of the helix will ride up on the small fillet, here shown in exaggerated form. Since the washer is helical in configuration, at least one of the coils can take advantage of this movement to force itself into even more firm sealing contact with the concentric surface 22 which opposes it. This illustrates one of the features of the present invention which leads to a more efficient fluid seal arrangement and which makes for a positive deterrent to extrusion of the packing ring 26 into the clearance space 16.

Another quality, not readily disclosed in drawings, lies in the fact that Teflon plastics, and in particular polymers of tetrafluoroethylene, act as solid lubricants, since their surfaces inherently have very low coefficients of friction when machined or otherwise formed in a manner that provides them with a smooth uniform surface. Thus, as the fluid pressure moves and distorts the sealing ring and the axially adjacent washers, the coils of the helix "work" against each other to constantly expand and contract into more perfect sealing contact with the surface 22 opposing the annular groove 20. Likewise the low friction characteristics of the washers will aid in achieving a low friction axial movement of one member relative to the other in such installations as pistons, plungers and so on. Leather and fiber packings and washers, in any configuration, cannot act in this manner since they are soft and will bind or stick to each other rather than slide into better sealing contact.

By reason of the ability of the washer to "work" it is apparent that it can compensate for any lack of contact of the inner and outer peripheral faces 38 and 40 with the bottom wall 18 of the groove 20 and the opposed surface 22. However, maximum efficiency will be provided if the radial dimension of each cross section of each coil of the helix, that is, the radial distance between said inner and outer peripheral faces 38 and 40, is designed to provide a close tolerance fit between the bottom wall and the opposed surface. Even an interference fit will function completely satisfactorily since the solid lubricant characteristics of the washer, when coupled with its helical configuration, will permit it to work and slide on the metal and on each coil to provide the necessary support to the sealing ring. Extensive tests clearly establish that the function of the washer is not impaired when subjected to wide ranges of temperature variation in operation or when subject to high or low temperatures for prolonged periods of operation. In fact the major limitation on the installation's efficiency now seems to be imposed primarily by the composition and type of sealing ring which is used in conjunction with the washer of the present invention.

The installation shown in Figures 3 and 4 is designed to prevent leakage under conditions where the unbalanced pressure will tend to shift the sealing ring and washers to either the left or right depending on the conditions of unbalance at any given moment. Thus two directional flow tendencies exist and must be resisted in order to produce effective sealing conditions. Where only unidirectional flow will tend to occur in a given installation it has been found that an efficient sealing arrangement is one in which only one washer is utilized.

Again it should be pointed out that the preferred form of helical type back up washers has been shown. It is apparent that numerous other shapes may be used in a manner that will make use of the present invention. The common factors are the presence of a peripheral coil surface to contact the concentric mating surface opposing the annular groove.

It is a very important discovery in accordance with my invention that my helical back up ring made of polytetrafluoroethylene gives in the combination a surprising number of new and unexpected results.

"Teflon" is Du Pont's trademark applied to the polymers of tetrafluoroethylene. The resin is made by polymerizing gaseous tetrafluoroethylene to yield a solid, granular polymer. The chemical equation involved in this process is

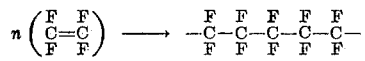

"Teflon" polymer consists of long straight-chain molecules packed closely together. This structure and the chemical bond between carbon and fluorine in the molecule impart exceptional properties of resistance to heat and to chemicals.

"Teflon" in thin sections is transparent, but in thicker pieces it is waxy in appearance, and white or gray in color.

Average values of some of the physical and chemical properties of "Teflon" are listed in Table I. The outstanding properties are its toughness over a wide range of temperatures, its excellent electrical properties over a wide range of frequencies, its extreme inertness to chemicals, and its resistance to heat.

Normally, "Teflon" has a crystalline structure, but when heated above 620° F. it is changed to an amorphous jelly. In the neighborhood of 750° F., it decomposes slowly to yield the gaseous monomer plus small amounts of other gaseous derivatives of fluorine. At temperatures below the transition point, "Teflon" is remarkably stable. The tensile strength of molded bars kept at 570° F. for one month will drop only 10-20%. At 480° F., the loss in tensile strength is negligible over very long intervals. The material suffers no detectable loss in weight from being baked at the transition temperature (620° F.) for many hours.

The chemical resistance of "Teflon" is outstanding. It withstands the attack of practically all chemicals except molten alkali metals. It has been boiled in many solvents, including a variety of halogenated hydrocarbons, ketones, esters, and alcohols, without swelling or any other sign of attack. "Teflon" can be boiled in aqua regia, hydrofluoric acid, sulphuric acid or nitric acid with no change in weight or properties. It is equally resistant to the attack of strong alkalies. Chlorine, bromine or iodine do not react with "Teflon," but fluorine and chlorine trifluoride will react under special conditions. It can be used over the temperature range of −320° F. to 550° F.

*Table I—Typical properties of "Teflon"*

[Data given represent standard commercial grades of material and standard methods of testing except where otherwise noted]

| Property | Value | Method |
|---|---|---|
| Specific gravity | 2.1-2.3 | D793-44T. |
| Tensile strength at 77° F., p. s. i | 1,500-2,500 | D638-44T.[1] |
| Elongation at 77° F., percent | 100-200 | D638-44T. |
| Flexural strength at 77° F., p. s. i | 2,000 | D650-42T.[2] |
| Stiffness at 77° F., p. s. i. (0.125 in.) | 60,000 | D747-43T. |
| Impact strength, Izod, −70, 77, 170° F., ft-lb./in. | 2.0, 4.0, 6.0 | D256-41T. |
| Hardness, "D," Durometer | 55-70 | |
| Compressive strength, p. s. i., at 0.1% deformation | 1,700 | D695-42T. |
| Deformation under load at 50° C. under 1,200 p. s. i., percent in 85 hr. | 4-8 | D621-43. |
| Heat-distortion temperature, low-load, °F. | 270 | D648(B)44T. |
| Specific heat, B. t. u./lb./°F | 0.25 | (3). |
| Coefficient of linear expansion per °F. (77-140° F.) | 5.5×10⁻⁵ | D696-42T. |
| Thermal conductivity, B. t. u./hr./ft.²/ °F./in. (0.18 in.) | 1.7 | Arl.P-32.[4] |
| Dielectric strength, short-time, volt/mil (0.080 in.) | 400-500 | D149-40T.[5] |
| Surface arc-resistance, seconds | 700 | D495-42.[6] |
| Volume resistivity, ohm-cm | 10¹⁸ | D257-38. |
| Surface resistivity at 100% rel. humidity, megohms | 3.6×10⁶ | D257-38. |
| Dielectric constant at 60, 10³, 10⁶, 10⁸ cycles | 2.0-2.05 | D150-40T. |
| Power factor at 60, 10³, 10⁶, 10⁸ cycles | 0.0005 | D150-40T. |
| Water-absorption, percent | 0.00 | D570-42.[7] |
| Static coefficient of friction against polished steel | 0.09-0.12 | (8). |
| Vapor pressure, mm. Hg at 25° C | 10⁻⁶ | |
| Outdoor weathering | No detectable change in 3 yrs. | |

[1] Tensile strength in oriented film may be as high as 15,000 p. s. i.
[2] Specimens do not break.
[3] Method of mixtures.
[4] Cenco-Fitch apparatus.
[5] 1,000-2,000 volts/mil in thicknesses 5 to 12 mils.
[6] Does not track.
[7] Not wet by water unless a surface-active agent is added.
[8] Inclined-plane method.

It is especially significant that this Teflon helical back up ring of my invention performs with surprisingly satisfactory results when used in the hydraulic system of aircraft operating at a pressure of 3000 pounds per square inch. Such hydraulic systems are described, for example, in DC-4 Maintenance Manual, volume III, Section 1, Hydraulics, "Douglas Service" Magazine, April 1947, pages 10 and 11, and February 1948, pages 10 and 11, published by Douglas Aircraft Co., Inc., Santa Monica, California.

The helical Teflon back up ring of my invention performs surprisingly well to avoid the usual wear and chewing of the rubber O ring used as the seal. For example, it works surprisingly well with a butyl rubber O ring which, with ordinary back up rings, has an unusually high tendency to wear, due to the fact that butyl rubber has great elasticity and therefore extrudes readily but has a slow recoil or slow rate of recovery after extension, so that it requires a firmer back up ring under all conditions of use in the hydraulic system to prevent damage to the O ring resulting from wear caused by sharp changes in direction of the pressure of the hydraulic fluid or direction of movement of the piston head. Such wear is especially pronounced due to the back and forth movement of the piston head and testing equipment has been devised for accelerating and exaggerating such a condition in which test the butyl ring with the usual leather back up ring will last only 6 minutes, whereas with the Teflon helical back up ring of my invention it will last for one hour, that is, at least 10 times as long.

The Teflon back up ring of my invention performs such unexpected and new results, probably to some extent because of the high yield point of this plastic material under the wide range of pressures, sudden changes in pressure, and wide range of temperatures under conditions of use, and also probably because of the surprising inertness of this plastic material to the chemical materials used as hydraulic fluids, such as those containing organic phosphates, chlorinated hydrocarbons, hexachlorobutadiene and hexachloropropylene, and mineral oils. To these chemicals the back up ring of my invention is not only inert chemically, but also it is not plasicized by such materials to change its physical properties.

The back up ring of my invention makes possible dimensional control at the seal with very close tolerance under all conditions of use in the hydraulic system. It has a low coefficient of friction between turns of the helix and the helix can be wound on to place in the annular groove without any permanent deformation of the back up ring. In use it can maintain itself as a zero clearance element. It will perform its desired functions at operating pressures of 3000 pounds per square inch, involving back and forth motion, including a surge to pressures to about as high as 6000 pounds per square inch, and throughout a temperature range of below —65° F. up to 300° F.

Still another possible explanation of the surprising new and unexpected results obtained with the poly tertafluoroethylene back up ring of my invention is that my ring apparently wipes a very thin film of perhaps microscopic quantities of the polymer upon the surface of the cylinder to produce a lubricant film which lubricates the frictional surface between the rubber O ring and the steel metal surface of the cylinder wall. Instead of steel it will be understood, of course, that in some cases cylinder walls will be aluminum, bronze, chromium plated on steel or other cylindrical surfaces and in accordance with this aspect of my invention a lubricating film of polymer is also wiped on such frictional surfaces.

Among the hydraulic fluids for which the Teflon back up ring of my invention is useful, is the hydrocarbon hydraulic fluid known as AN–VV–O–366b obtained on the market as Servo Liquid No. 7. It contains about 89% of a naphthenic hydrocarbon oil, 10% of Acryloid HF–855, and about 1% of an oxidation inhibitor. Acryloid HF–855 is a polymerized octyl methacrylate having an average molecular weight of about 15,000 and a range of about 7,000 to 20,000, dissolved in 45% by volume of a light petroleum oil of 200° F. flash point, obtained from the Rohm and Haas Company under its trademark designation Acryloid HF–855. This Servo Liquid No. 7 had the following inspection properties:

Pour point _____ Below —60° F.
Viscosity at:
   210° F _____ 44 SSU.
   100 _____ 77 SSU.
   0 _____ 450 SSU.
Neutralization No _____ 0.10.

Although the now preferred embodiment of the present invention has been illustrated and described it is to be understood that the invention need not be limited thereto for it is susceptible to changes in form, detail and application within the scope of the appended claims.

I claim:

1. A packing arrangement for mating members comprising a first member having a cylindrical mating surface; a second member movable concentrically with respect to said first member and having a surface mating with the cylindrical mating surface of said first member; an annular groove formed in the mating surface of one of said members; an elastomeric O ring disposed in said groove and in sealing engagement with the mating surface of the other member; and a helical back-up ring composed of polytetrafluoroethylene disposed in said groove axially adjacent said O ring and extending radially beyond said groove toward the mating surface of said other member, said helical back-up ring having at least one and one-half washer-like, adjacent coils.

2. A packing arrangement for mating members comprising a first member having a cylindrical mating surface; a second member movable concentrically with respect to said first member and having a surface mating with the cylindrical mating surface of said first member; an annular groove formed in the mating surface of one of said members; an elastomeric O ring disposed in said groove and in sealing engagement with the mating surface of the other member; and a helical back-up ring composed of polytetrafluoroethylene disposed in said groove axially adjacent said O ring on each side of said O ring and extending radially beyond said groove toward the mating surface of said other member each of said helical back-up rings having at least one and one-half washer-like, adjacent coils.

3. A packing arrangement as set forth in claim 1 in which the elastomeric O ring is composed of butyl rubber.

4. A packing arrangement as set forth in claim 2 in which the elastomeric O ring is composed of butyl rubber.

5. A packing arrangement as set forth in claim 1 in which the cross-section of the coils of the helical back-up ring is rectangular with the large dimension of the rectangle extending radially of the helix and the short dimension of the rectangle extending axially of the helix and the number of coils in the helix is about two.

6. A packing arrangement as set forth in claim 1 in which the elastomeric O ring is composed of butyl rubber, the cross-section of the coils of the helical back-up ring is rectangular with the large dimension of the rectangle extending radially of the helix and the short dimension of the rectangle being less than about one-half the large dimension and extending radially of the helix, and the number of coils in the helix is about two.

References Cited in the file of this patent

UNITED STATES PATENTS

| Number | Name | Date |
|---|---|---|
| 558,236 | Thomas et al. | Apr. 14, 1896 |
| 1,229,258 | Haas | June 12, 1917 |
| 1,342,131 | Mycock | June 1, 1920 |
| 2,348,939 | Thompson | May 16, 1944 |
| 2,349,170 | Jackman | May 16, 1944 |
| 2,437,814 | Hallen | Mar. 16, 1948 |
| 2,456,356 | Aber | Dec. 14, 1948 |
| 2,467,312 | Jack | Apr. 12, 1949 |
| 2,494,598 | Waring | Jan. 17, 1950 |